Aug. 18, 1931.   R. HOE   1,819,463
WASHING APPARATUS
Original Filed Sept. 29, 1926   5 Sheets-Sheet 2
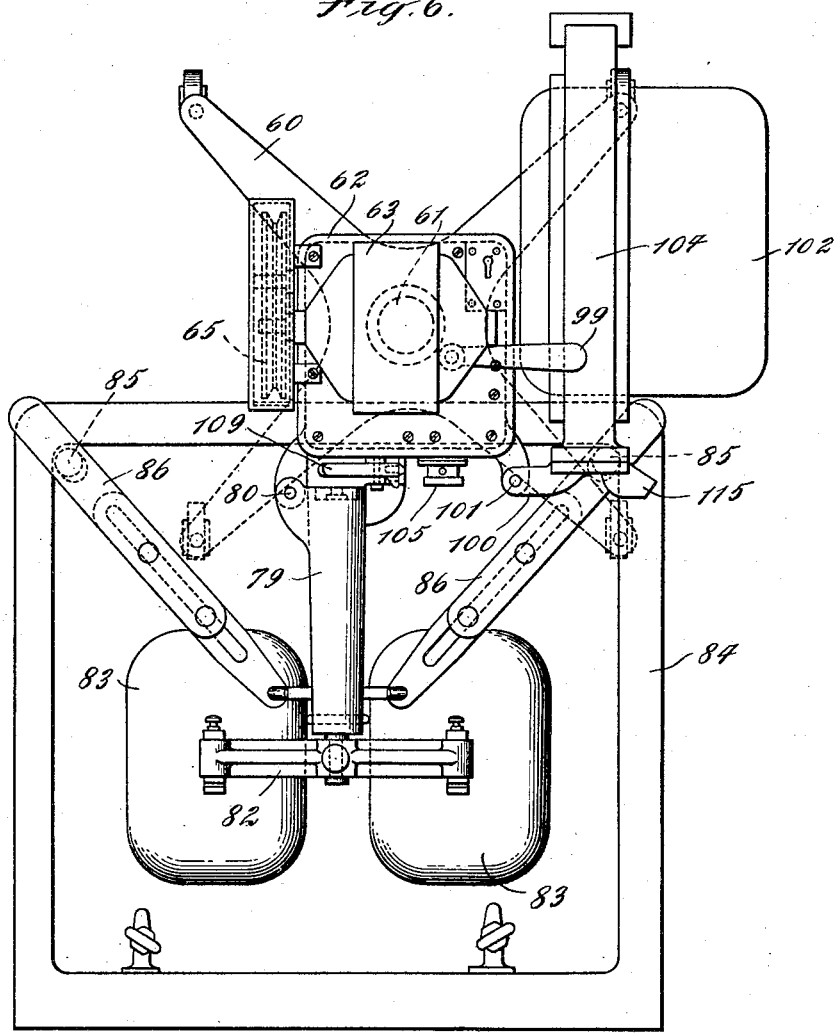
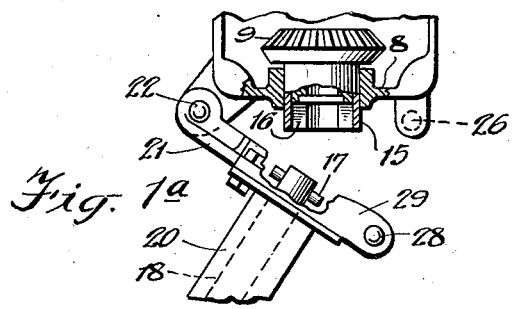

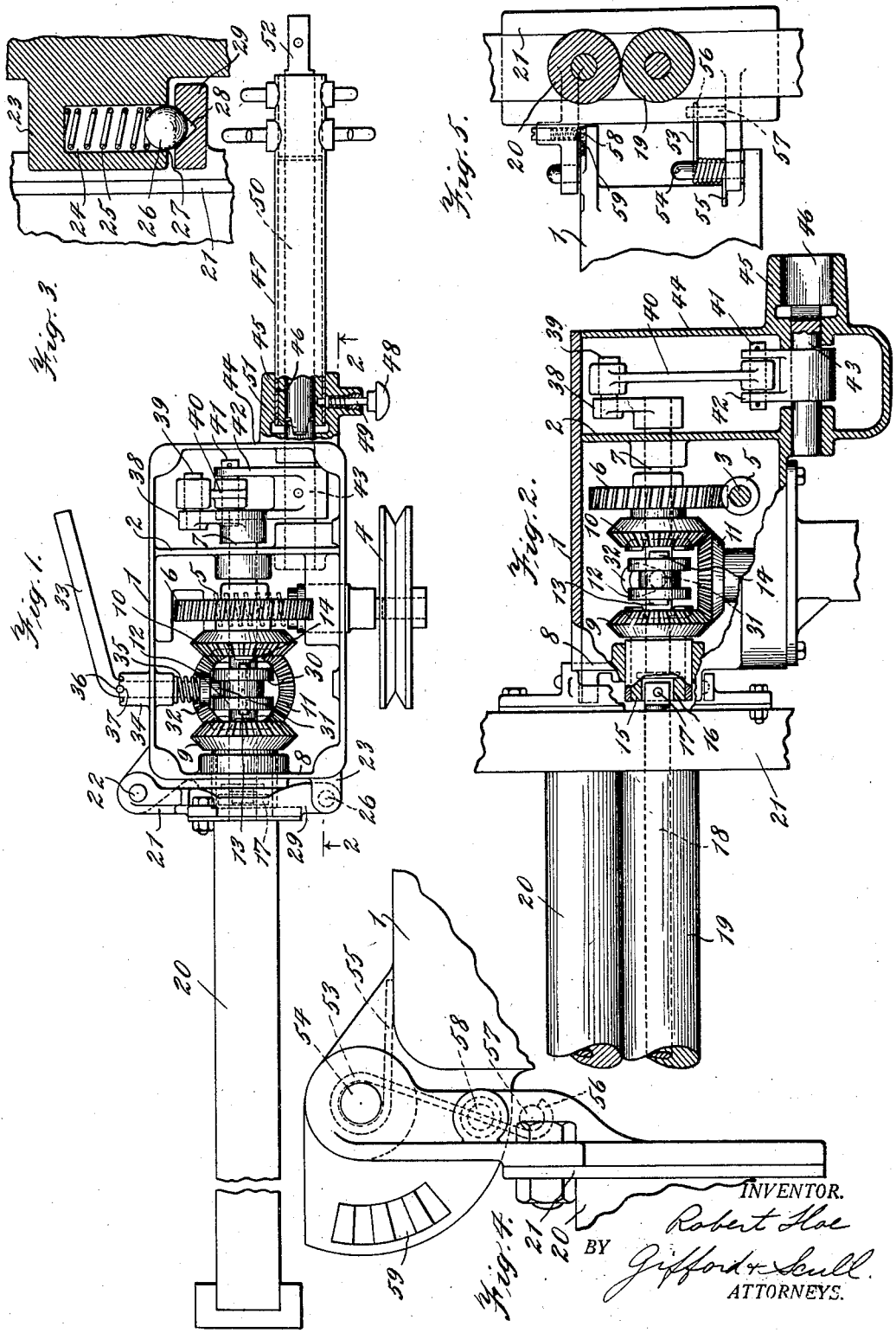

Aug. 18, 1931.  R. HOE  1,819,463
WASHING APPARATUS
Original Filed Sept. 29, 1926   5 Sheets-Sheet 3

INVENTOR
Robert Hoe
BY
Gifford & Scull
ATTORNEY

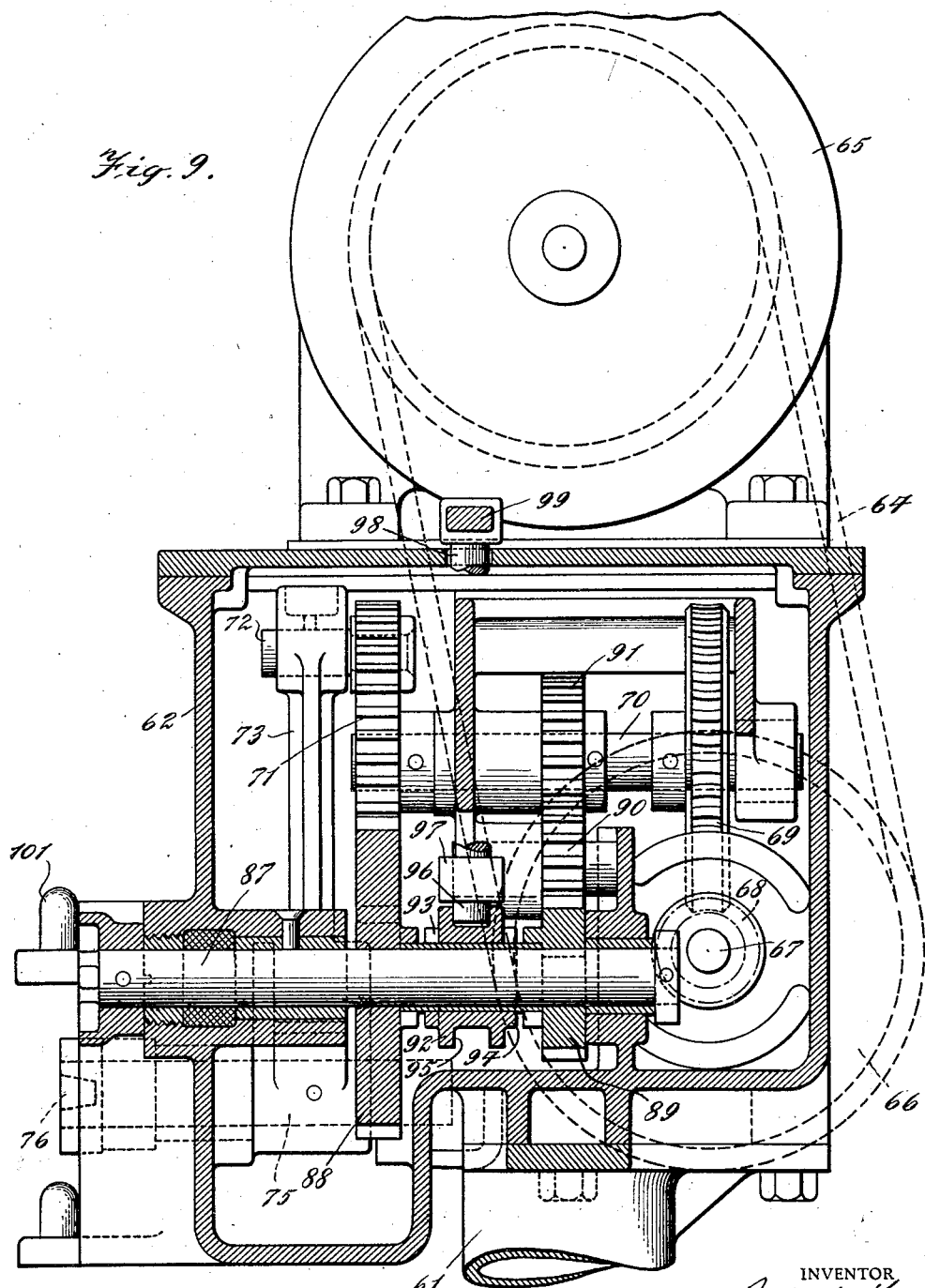

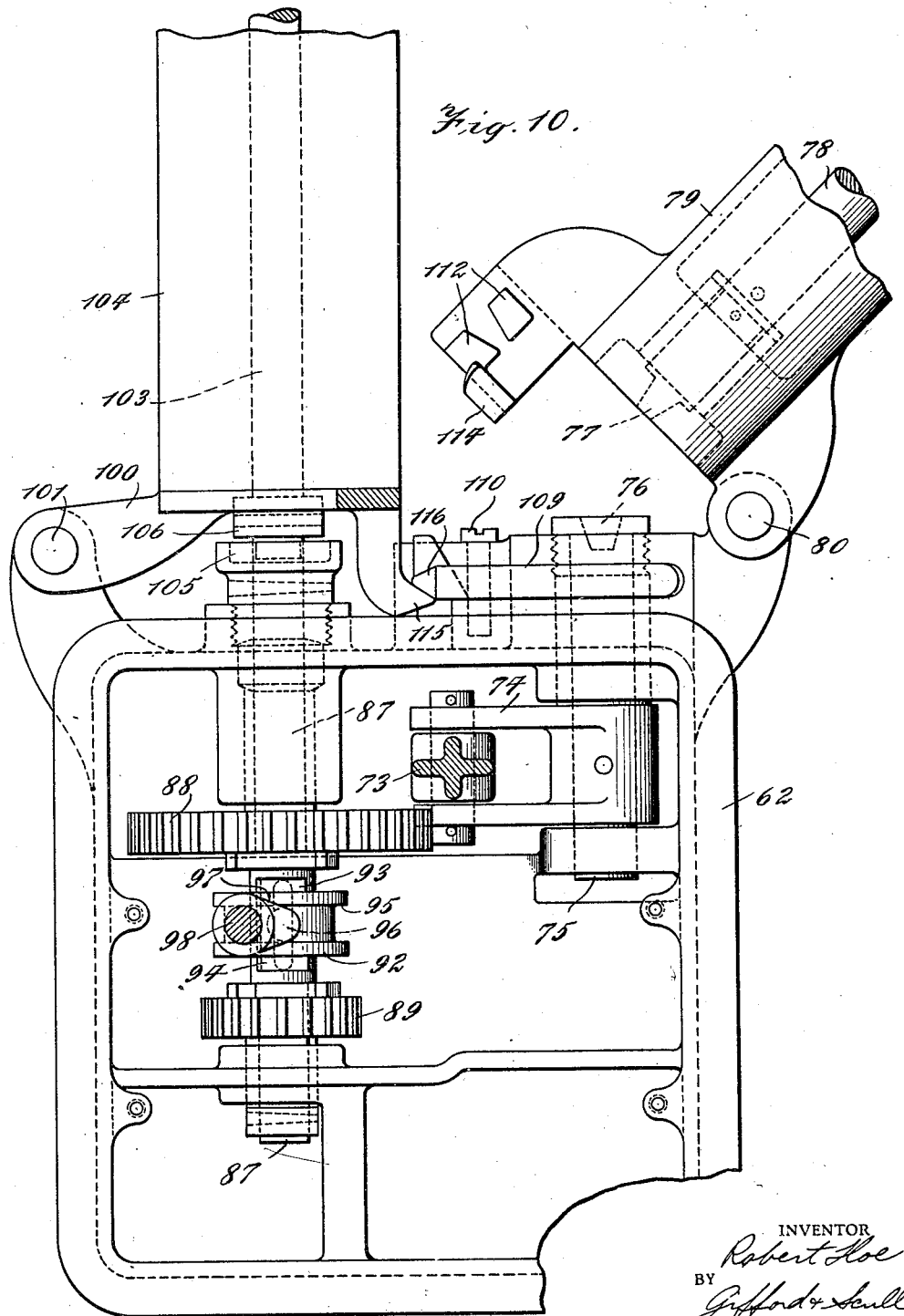

Patented Aug. 18, 1931

1,819,463

UNITED STATES PATENT OFFICE

ROBERT HOE, OF HYDE PARK, NEW YORK

WASHING APPARATUS

Original application filed September 29, 1926, Serial No. 138,356. Divided and this application filed June 22, 1927. Serial No. 200,574.

This application is a divisional continuation in part of my copending application, Serial No. 138,356, Filed September 29, 1926.

The invention relates to a novel and improved washing apparatus and more particularly to features which will be pointed out during the progress of the following description.

In the accompanying drawings, in which I have shown selected embodiments of the invention;

Fig. 1 is a horizontal sectional view through a machine showing one form which my invention may take.

Fig. 1ª is a view, partly in plan and partly in horizontal section, of some of the structure appearing in Fig. 1, but with the parts in different position to better illustrate the clutch arrangement.

Fig. 2 is a vertical sectional view, taken approximately on the line 2—2 of Fig. 1, certain elements being omitted and others broken away for the sake of clearness.

Fig. 3 is an enlarged sectional view showing the details of the form of latch shown in Figs. 1 and 2.

Fig. 4 is a fragmentary view showing a modification of one of the details of the invention.

Fig. 5 is a view on a reduced scale of the modification shown in Fig. 4, this view being taken from the top of that figure with the bracket open.

Fig. 6 is a plan view of another embodiment which my invention may take, and shown as applied to a tub.

Fig. 9 is a section on the line 9—9 of Fig. 8.

Fig. 10 is an enlarged plan view of certain of the mechanism appearing in Fig. 9, with the cover of the gear box removed.

Figure 7:
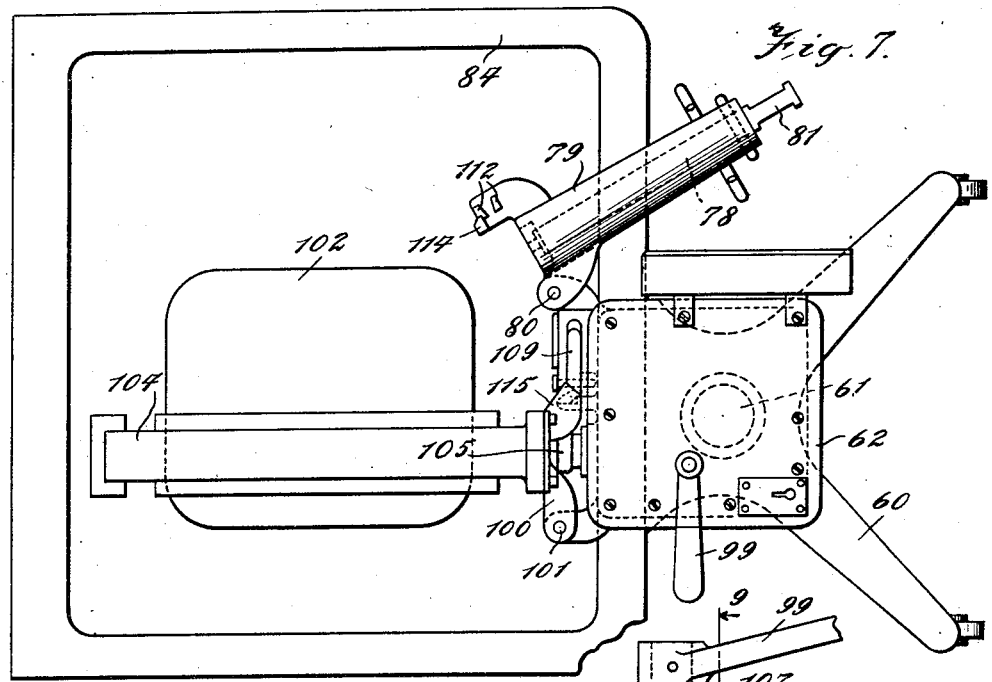
Fig. 7 is another plan view of the construction shown in Fig. 6, but with the parts in a different position.

Referring first to the embodiment shown in Figs. 1, 2 and 3, which embodiment I now consider the preferred one, there is shown a gear box 1 divided by a vertically extending partition 2, into two compartments. Disposed in one of these compartments is a power shaft 3 which may be actuated from any suitable source of power as by a belt running over a pulley 4 secured to the shaft.

Disposed on the shaft 3 is a worm 5 meshing with a worm gear 6 which is fast on a shaft 7 journaled in bearings in the partition 2 and in the end wall 8 of the box.

Rotatively mounted upon the shaft 7 are two beveled gears 9 and 10, meshing with a pinion 11 in the manner shown. Splined upon the shaft 7 and disposed between the gears 9 and 10, is a clutch collar 12. This collar is provided with clutch teeth 13 and 14 on opposite faces thereof and which are adapted to be received within corresponding recesses in the gears 9 and 10 respectively. By this means, the shaft 7 may run idly without rotating the gear 9, or the gear 9 may operatively be connected thereto so as to be rotated in either one of two directions.

The gear 9 is provided with a hub 15 having a recess 16 therein which is adapted to receive a clutch tooth 17 upon the end of a shaft 18, upon which a roller 19 is mounted. The roller 19 is one of a pair of rollers, the other one of which is indicated at 20 and which forms a well known wringer for use in handling material being dried. The rollers are rotatively mounted in any usual manner in a bracket 21 which is hinged as at 22 to the gear box.

The arrangement is such that as the bracket is swung away from the box, the tooth 17 will be removed from the recess 16 and thereby the driving connection formed by the engagement of the tooth 17 in the recess 16 is broken. It is an important feature of my invention that this connection may be readily broken, so as to avoid damage to the person operating the apparatus.

When a wringer is being operated, the operator normally pushes clothes and the like between the rollers of the wringer and it is common experience that an operator's fingers are often caught between the rollers. This is particularly dangerous when the rollers are being operated continuously as by a motor. If the operator gets the fingers of both hands between the rollers, he is then helpless to stop the motor and even if he gets only one hand so caught, the motor may be out of reach of the other hand and so serious injury may result.

The above described arrangement forms a safety device whereby the driving connection between the wringer and the operating mechanism therefor may be quickly broken. All that is necessary to cause this breaking of the connection, is to swing the bracket carrying the rollers about its hinge 22. In a great many cases, this will be done almost instinctively by a person who is about to get his fingers caught between the rollers. Such a person will instinctively exert the necessary pressure on the wringer when he finds his fingers being pinched.

To yieldingly hold the bracket in operative position, I provide on the frame of the box an ear 23 having a recess 24 in which is disposed a spring 25 which yieldingly forces a ball 26 downwardly in the recess, escape of the ball being prevented by any of the usual means, such as upsetting the edge of the recess as indicated at 27. The ball is adapted to be received in a recess 28 in the ear 29 on the bracket 21. By this means a bracket and consequently a wringer will be latched in operative position, but may be readily unlatched by the exertion of a moderate amount of pressure on the wringer.

In this connection, it should be noted that the pressure which a person would exert on the wringer if he were in danger of getting his fingers caught, would be exerted in such a way as to provide large leverage and thus exert a force on the latch which will be ample to release it.

In order to operate the clutch collar 12, that collar is provided with a groove 30 in which rides a pin 31 on a lever 32 which may be operated from the outside of the box by means of a suitable handle 33 which is journaled in a suitable bearing 34 in the box.

The lever 32 is held in position with the pin 31 in the groove by means of a suitable spring 35. The handle may be operated to bring the collar to the desired position and then may be releasably held in that position by means of a detent 36 on the handle engaging any one of a plurality of notches 37 on the bearing 34. The spring 35 permits the handle to be raised sufficiently to release the detent from the notch in which it is engaged.

It will be seen that the shaft 7 extends through the partition 2 and has mounted on its end a crank 38, the pin 39 of which is pivoted to a link 40 which is pivoted at its other end to a pin 41 of a crank 42 secured to a rock shaft 43. This rock shaft is journaled in suitable bearings in partition 2 and in the wall 44 of the gear box and extends through a suitable opening in the wall 44.

Axially aligned with the rock shaft is a boss 45 having a bore 46 within which is disposed a sleeve 47. This sleeve may be detachably secured in position in the bore 46 by means of a latch herein shown as a button 48 having a spring pressed pin 49 adapted to engage in a suitable hole in the sleeve.

Journaled in the sleeve 47 is a shaft 50 having a clutch tooth 51 at one end thereof, which is adapted to be received in a recess in the end of the shaft 43. The other end of the shaft 50 is flattened at 52 for engagement with the arms of a washing device.

By the above arrangement, the shaft 50 may be readily removed from its operative position when the apparatus is not used. It will also be seen that the arrangement is very compact and simple. One longitudinally extending shaft is employed for operating either the wringer or the washing device. When the washing device is being used, then the clutch collar may be operated to disconnect the wringer, or the wringer may be disconnected by swinging the wringer bracket away from the gear box. When swung away, it may be lifted completely off the hinges if so desired, and then will be out of the way altogether. When it is desired to use the wringer, the sleeve 47 may be disconnected from the gear box and the clutch may be operated to connect the wringer to the shaft 7. The rock shaft 43 will then be operated idly during the operation of the wringer.

In Figs. 4 and 5, I have shown a modified arrangement for yieldingly holding the wringer bracket with the wringer, in operative position. The bracket 21 corresponds in all respects to the bracket shown in Figs. 1 and 2, and it supports the rollers 19 and 20 in the same manner. The bracket is yieldingly held closed, that is with the wringer in operative position, by means of a spring 53 wound about a hinge pintle 54 having one end 55 resting against the gear box and the other end 56 engaging a projection 57 on the bracket.

By this arrangement the latch to hold the wringer in operative position may be dispensed with, whereby a person about to have his fingers caught between the rollers, will merely have to overcome the tension of the spring 53. With this embodiment, a latch may be provided to hold the bracket in open position with the wringer inoperative and this latch may take the form of a spring pressed ball 58 adapted to engage a rack 59 formed of a plurality of vertically disposed teeth, whereby the bracket may be held in any one of a plurality of positions.

Referring to Figs. 6 to 10, inclusive, I have shown therein another form which my invention may take, this being the form of my aforesaid copending application of which the following matter is a division.

In the arrangement shown in the above figures, the washing apparatus is supported upon a base 60 provided with casters or the like, whereby it may be readily moved over the floor or other support upon which it rests. This base is provided with a suitable column 61 on which is supported a gear box 62. Supported on the gear box is a suitable motor 63, this motor being connected by a belt 64 and pulleys 65 and 66, to a shaft 67 journaled in the gear box. Secured to the shaft 67 is a worm 68 meshing with a worm gear 69, on a crank shaft 70. This shaft has secured thereto a gear 71 carrying a crank pin 72 to which is pivoted a pitman 73, which in turn is pivoted to a crank 74 secured to the shaft 75. The end of the shaft 75 is provided with a recess 76, as best shown in Fig. 10, and this recess is adapted to receive a clutch tooth 77 on the end of a shaft 78 journaled in bracket 79 which is hinged to the gear box as at 80.

The other end of the shaft 78 is provided with flat faces 81 to receive the arm 82 to which are connected the washing bells 83. The bracket is normally supported above a suitable tub 84 and held in proper relation thereto by means of stops 85 engaging interior corners of the tub and supported upon arms 86, these arms being carried by the bracket 79 in a manner more fully set forth in my aforesaid copending application.

Disposed substantially parallel to the shaft 70 is a driving shaft 87 and this shaft is adapted to be operatively connected to the shaft 70 through two trains of gearing. One of these trains comprises a gear 88 rotatively mounted upon the shaft 87 and meshing with the gear 71 secured to the shaft 70. The other train comprises a gear 89 rotatively mounted upon the shaft 87 and meshing with an idler pinion 90, which in turn meshes with the gear 91 secured to the shaft 70. Splined on the shaft 87 between the two gears 88 and 89, is a clutch collar 92 having teeth 93 and 94 adapted to mesh with corresponding teeth upon the hubs of the gears 88 and 89 respectively.

Figure 8:
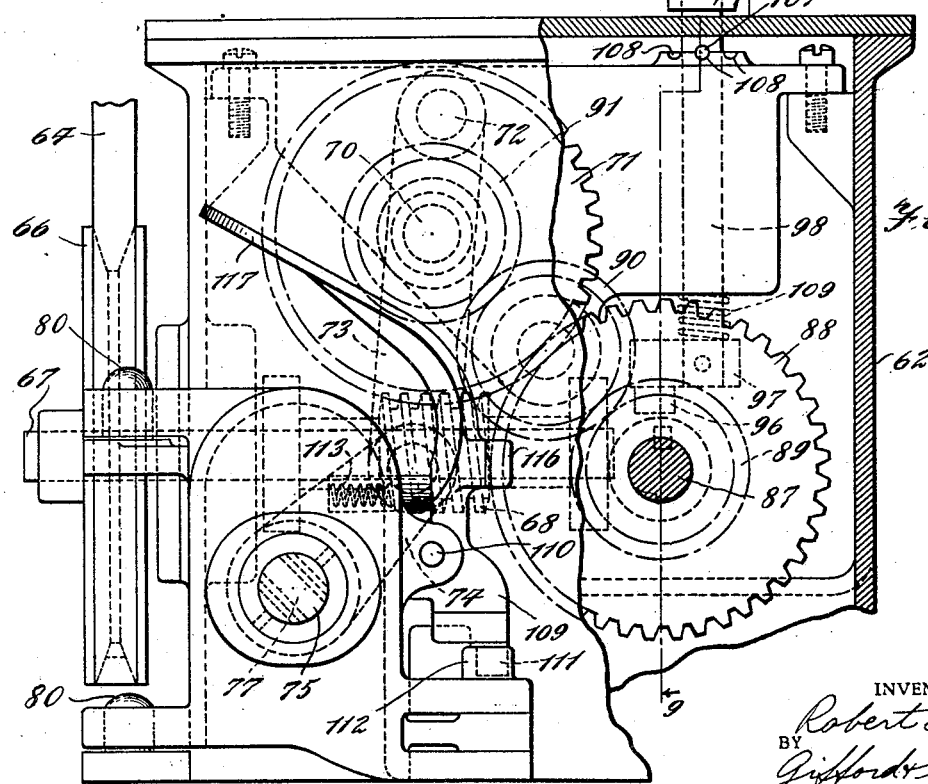
Fig. 8 is an enlarged view, part being broken away, of the gear box, this view being taken from the left, as viewed in Fig. 7.

Riding in the groove 95 of the collar is a pin 96, mounted on a lever 97 which is operated by a rod 98 extending through the top of the gear box, as best shown in Fig. 8. The rod is provided with a suitable handle 99 and it will be obvious that upon operation of this handle, the clutch collar will be shifted so as to operatively connect shafts 70 and 87 through one train of gearing or the other.

It will also be obvious that by this arrangement, the shaft 87 may be rotated in either direction. The driving shaft 87 is adapted to operate the rollers of a wringer, and in this embodiment the rollers are shown as mounted upon a bracket 100 which is pivoted as at 101 to the gear box. In Fig. 7, the bracket is shown with the wringer in operative position, with the drain board 102 in place above the tub 84. When in this position, the shaft 103 of one of the rollers 104 is operatively connected to the driving shaft 87 by means of a suitable clutch which may comprise two members 105 and 106, of the same general form as the two members 76 and 77 respectively.

It will be seen that by the above arrangement, the rollers may be rotated in either direction by manipulation of the handle 99, this handle being held in desired position by means of a detent 107 which is adapted to engage any one of the recesses 108 as shown in Fig. 8. A suitable spring 98' is disposed about the rod 98 between the lever 97 and a fixed part of the box, and this spring urges the pin 96 into the groove 95 and also permits the detent 107 to be lifted out of one of the recesses 108 when it is desired to rotate the handle. At the same time, the spring yieldingly holds the handle and therefore the clutch collar, in desired position.

Means is provided for holding both the bracket 79 and the bracket 100 in operative position, whereby the shafts 78 and 103 respectively will be clutched to the shafts 75 and 87. This means is exemplified by a latch 109 which is pivoted on the gear box at 110 and which has two projections thereon, adapted to engage with and hold the brackets 79 and 100.

Referring to Fig. 8, it will be seen that the latch is provided with a downwardly extending projection or toe 111, adapted to be received between a pair of stops 112, one of the stops being shown in Fig. 8 and both being better shown in Figs. 7 and 10. The latch is normally urged in a clockwise direction about its pivot by means of a suitable spring 113 and a cam piece 114 is provided on the bracket 79 so that when the bracket is brought into operative position, this cam piece will engage the toe 111 to lift the latch against the action of the spring 113. After the cam piece has passed the toe, the toe may be dropped into the space between the stops 112.

The bracket 100 is provided with a projection 115 which is adapted to be received behind a toe 116 on the latch 109. By this means, the bracket 100 is held in operative position with the shafts 103 and 87 clutched together. When the bracket 100 is brought to the position shown in Figs. 7 and 10, the projection 115 will snap by the toe 116, the latch being rotated about its pivot against the action of the spring 113. The latch will then snap back into position to hold the bracket 100 yieldingly in operative position.

By the above arrangement, it will be seen that the wringer bracket 100 is yieldingly held in operative position. If an operator gets his fingers caught between the rollers, he may readily swing the bracket to the inoperative position, the inclined surfaces of the projection 115 and the toe 116 permitting this, and the latch 109 rotating about its pivot against the action of the spring 113 to permit the projection 115 to pass the toe 116. The latch is provided with a finger piece 117, whereby the latch may be manually operated.

While I have shown the invention as embodied in a specific form, it is to be understood that various changes in details may be made without departing from the scope of the invention, and I therefore do not intend to limit myself except by the appended claims.

I claim:

1. In combination, a support, a horizontally disposed rotating shaft in said support, means to drive said shaft, a device comprising rollers one of which is mounted on a shaft, a bracket supporting said device and hinged to said support and arranged, when in operative position, to hold said roller shaft in axial alignment with said rotary shaft, a clutch connection between the adjacent ends of said shafts arranged to be unclutched when said bracket is turned on its hinges, and means to hold said bracket in operative position, said means comprising a latch arranged to open and permit said bracket to swing on its hinge when considerable pressure is applied to said bracket to turn it on its hinge.

2. In combination, a gear box, a horizontally disposed rotatable shaft supported in said box with an end extending through the wall of the box, a bracket hinged to said box adjacent the end of said shaft, a shaft supported in said bracket and arranged to be in axial alignment with said rotatable shaft when the bracket is in operative position, a clutch connection between the adjacent ends of said shafts and arranged to be unclutched when the bracket is swung on its hinge out of operative position, a power shaft within said box, a pair of driven gears freely rotatable on said rotatable shaft and connected to said power shaft so that said driven gears rotate in opposite directions, a clutch member connected to said rotatable shaft, and means operable from the exterior of the box to clutch either of said driven gears to said rotatable shaft.

3. In combination, a gear box, a rotatable shaft supported in said box with an end extending through the wall of the box, a bracket hinged to said box adjacent the end of said shaft, a shaft supported in said bracket and arranged to be in axial alignment with said rotatable shaft when the bracket is in operative position, a clutch connection between the adjacent ends of said shafts and arranged to be unclutched when the bracket is swung on its hinge out of operative position, a power shaft within said box, a pair of driven gears freely rotatable on said rotatable shaft and connected to said power shaft so that said driven gears rotate in opposite directions, a clutch member connected to said rotatable shaft, and means operable from the exterior of the box to clutch either of said driven gears to said rotatable shaft, said means including a pin engaging a groove in said clutch member, a spring to hold said pin towards the axis of the clutch member, an axially movable and rotatable rod to which said pin is connected and a detent to hold said rod against axial movement, said detent being releasable when the rod is moved axially.

4. In combination, a device having a support therefor arranged to permit bodily movement of the device, means to hold the device yieldingly in operative position, a driven shaft on the device and a driving shaft on the support, a clutch between said shafts and closed when the device is in operative position and arranged to be opened by movement of the device out of operative position against the pressure of the yielding holding means.

ROBERT HOE.